(12) United States Patent
Sakaguchi et al.

(10) Patent No.: US 11,852,198 B2
(45) Date of Patent: Dec. 26, 2023

(54) HUB UNIT BEARING AND METHOD FOR MANUFACTURING SAME

(71) Applicant: NSK LTD., Tokyo (JP)

(72) Inventors: Takashi Sakaguchi, Fujisawa (JP); Eisho Watanabe, Fujisawa (JP)

(73) Assignee: NSK, LTD., Tokyo (JP)

( * ) Notice: Subject to any disclaimer, the term of this patent is extended or adjusted under 35 U.S.C. 154(b) by 185 days.

(21) Appl. No.: 17/639,999

(22) PCT Filed: Sep. 7, 2020

(86) PCT No.: PCT/JP2020/033827
§ 371 (c)(1),
(2) Date: Mar. 3, 2022

(87) PCT Pub. No.: WO2021/045232
PCT Pub. Date: Mar. 11, 2021

(65) Prior Publication Data
US 2022/0325751 A1 Oct. 13, 2022

(30) Foreign Application Priority Data
Sep. 6, 2019 (JP) .................. 2019-162523

(51) Int. Cl.
*F16C 19/18* (2006.01)
*F16C 19/38* (2006.01)
*F16C 43/04* (2006.01)
*B60B 27/00* (2006.01)

(52) U.S. Cl.
CPC ............. *F16C 43/04* (2013.01); *B60B 27/001* (2013.01); *B60B 27/0005* (2013.01); *B60B 27/0084* (2013.01); *F16C 19/18* (2013.01); *F16C 19/186* (2013.01); *F16C 19/386* (2013.01); *F16C 2229/00* (2013.01); *F16C 2326/02* (2013.01)

(58) Field of Classification Search
CPC ...... F16C 19/18; F16C 19/186; F16C 19/386; F16C 43/04; F16C 2229/00; F16C 2326/02; B60B 27/0005; B60B 27/001; B60B 27/0084
See application file for complete search history.

(56) References Cited

U.S. PATENT DOCUMENTS

2016/0069394 A1* 3/2016 Ogata ................ B60B 27/0078
29/898.062

FOREIGN PATENT DOCUMENTS

| JP | 2004100841 A | * | 4/2004 | |
| JP | 2006052754 A | * | 2/2006 | ............. F16C 19/186 |
| JP | 2006052801 A | * | 2/2006 | ............. F16C 43/04 |

(Continued)

*Primary Examiner* — Phillip A Johnson
(74) *Attorney, Agent, or Firm* — Hartman Global IP Law; Gary M. Hartman; Domenica N. S. Hartman

(57) ABSTRACT

An amount of decrease ΔC in an axial clearance of a hub unit bearing is found based on an amount of expansion ΔD of an inner ring of the hub unit bearing, which is the difference between the outer-diameter dimension D1 of the inner ring after the inner ring is externally fitted with a tubular fitting portion of a hub spindle of the hub unit bearing and after formation of a swaged portion of the hub spindle, the inner ring being held between the swaged portion and a stepped surface of the hub spindle, and an outer-diameter dimension D0 of the inner ring before the inner ring is externally fitted with the tubular fitting portion.

4 Claims, 8 Drawing Sheets

(56) References Cited

FOREIGN PATENT DOCUMENTS

| | | | | |
|---|---|---|---|---|
| JP | 2006144949 | A * | 6/2006 | ............... F16C 43/04 |
| JP | 4506028 | B2 * | 7/2010 | ............... F16C 43/04 |
| JP | 4607081 | B2 * | 1/2011 | ............ F16C 19/187 |
| WO | WO-2012176787 | A1 * | 12/2012 | ........... B60B 27/001 |

* cited by examiner

AXIALLY OUTBOARD SIDE ←          → AXIALLY INBOARD SIDE

← AXIALLY OUTBOARD SIDE

→ AXIALLY INBOARD SIDE

← AXIALLY OUTBOARD SIDE

→ AXIALLY INBOARD SIDE

← AXIALLY OUTBOARD SIDE

→ AXIALLY INBOARD SIDE

HUB UNIT BEARING AND METHOD FOR MANUFACTURING SAME

CROSS REFERENCE TO RELATED APPLICATIONS

This application claims the benefit of PCT/JP2020/033827 filed Sep. 7, 2020, having a priority claim to Japanese Patent Application No. 2019-162523 filed Sep. 6, 2019. The contents of these prior patent documents are incorporated herein by reference.

TECHNICAL FIELD

The present invention relates to a hub unit bearing for rotatably supporting a wheel and brake rotating body of an automobile with respect to a suspension device, and to a method for manufacturing the same.

BACKGROUND ART

A wheel and brake rotating body of an automobile are rotatably supported with respect to a suspension device by a hub unit bearing. A hub unit bearing includes an outer ring having double-row outer-raceways around the inner-circumferential surface, a hub having double-row inner-raceways around the outer-circumferential surface, and a plurality of rolling bodies arranged so as to be able to freely roll between the double-row outer-raceways and double-row inner-raceways.

The hub includes an inner ring and a hub spindle. The inner ring, in a state in which an end surface on an axially outboard side is provided in an axially intermediate section of the hub spindle and comes in contact with a stepped surface facing an axially inboard side, is externally fitted by a press fit with a tubular fitting portion that is provided in an axially inboard side portion of the hub spindle. In this state, a swaged portion that is formed by plastically deforming a tubular portion of the tubular fitting portion that protrudes further toward the axially inboard side than the end surface on the axially inboard side of the inner ring pushes the end surface on the axially inboard side of the inner ring. As a result, the inner ring and the hub spindle are joined and fixed together, and a preload is applied to the rolling bodies.

In the hub unit bearing, when the preload applied to the rolling bodies is not within a proper range and the preload is too large, there is a possibility that problems such as a life reduction of the hub unit bearing, a deterioration in the driving performance of the automobile by increasing in the dynamic torque (rotational resistance) of the hub unit bearing, or the like will occur; and conversely, when the preload is too small, there is a possibility that problems such as a deterioration of the drivability of the vehicle by insufficient moment rigidity, or the like will occur. Therefore, strict control of the preload applied to the rolling bodies is required.

JP 2003-013979A describes a method in which after the inner ring is externally fitted with the hub spindle, the outer-diameter dimension of the inner ring is measured before and after the swaged portion is formed, and the axial force that is applied to the inner ring from the swaged portion is controlled based on the amount of expansion of the outer-diameter dimension of the inner ring. With the method described in JP 2003-13979A, it is possible to prevent creep from occurring between the hub spindle and the inner ring due to an insufficient axial force from the swaged portion, and to prevent the formation of indentations in the inner-raceway due to excessive axial force from the swaged portion.

CITATION LIST

Patent Literature

[Patent Literature 1] JP 2003-013979A

SUMMARY OF INVENTION

Technical Problem

Incidentally, the inner-raceway on the axially inboard side provided around the outer-circumferential surface of the inner ring is inclined in a direction toward the radially outer side while going toward the axially inboard side. Therefore, when the inner ring expands (outer-diameter dimension of the inner ring increases) as the inner ring is externally fitted with the hub spindle by press fitting, the rolling bodies in the row on the axially inboard side are press fitted toward the axially outboard side by the inner-raceway, and the preload applied to the rolling bodies increases. In other words, it is thought that not only the amount of expansion of the inner ring during formation of the swaged portion, but also the amount of expansion of the inner ring that occurs during press fitting of the inner ring with the hub spindle affects the preload applied to the rolling bodies. The amount of expansion of the inner ring that occurs during press fitting of the inner ring with the hub spindle changes due to the interference of the inner-circumferential surface of the inner ring with respect to the outer-circumferential surface of the tubular fitting portion. In the method described in JP 2003-013979A, the effect of the amount of expansion of the inner ring that occurs during press fitting of the inner ring with the hub spindle on the preload applied to the rolling bodies is not taken into consideration, and thus from the aspect of more accurately controlling the preload, it can be said that there is still room for further improvement.

In view of the situation described above, an object of the present invention is to achieve a hub unit bearing capable of more accurately controlling a preload applied to the rolling bodies, and a method for manufacturing the same.

Solution to Problem

The hub unit bearing that is the object of the present invention includes an outer ring, a hub, and a plurality of rolling bodies.

The outer ring is supported by and fastened to a suspension device so as not to rotate, and has double-row outer-raceways around an inner-circumferential surface thereof.

The hub to which a wheel is fastened rotates together with the wheel, and has double-row inner-raceways around an outer-circumferential surface thereof.

The plurality of rolling bodies are arranged between the double-row outer-raceways and the double-row inner-raceways, and a preload is applied thereto.

The hub includes an inner ring having an inner-raceway on an axially inboard side of the double-row inner-raceways around an outer-circumferential surface thereof, and a hub spindle having an inner-raceway on an axially outboard side of the double-row inner-raceways around an outer-circumferential surface at an axially intermediate section thereof.

The inner ring is externally fitted with a tubular fitting portion that is positioned further on the axially inboard side than the inner-raceway on the axially outboard side of the hub spindle, and the hub spindle has a swaged portion that is bent toward the radially outer side from an end section on the axially inboard side of the tubular fitting portion, and pushes the end surface on the axially inboard side of the inner ring. In other words, the inner ring and the hub spindle, in a state in which the inner ring is externally fitted with a tubular fitting portion positioned further on the axially inboard side than the inner-raceway of the hub spindle that is on the axially outboard side, are joined and fastened together by pushing an end surface on the axially inboard side of the inner ring by a swaged portion formed by plastically deforming a tubular portion of the hub spindle that protrudes further toward the axially inboard side than an end surface on the axially inboard side of the inner ring outward in a radial direction.

The method for manufacturing the hub unit bearing according to an aspect of the present invention includes:
- a pre-fitting step of measuring an outer-diameter dimension of the inner ring before externally fitting the inner ring with the tubular fitting portion;
- an arranging step of arranging the outer ring and the rolling bodies around the hub spindle;
- an external fitting step of externally fitting the inner ring with the tubular fitting portion;
- a swaging step of forming the swaged portion by plastically deforming the tubular portion outward in the radial direction; and
- a post-swaging step of measuring the outer-diameter dimension of the inner ring after formation of the swaged portion;
- then, finding an amount of decrease in an axial clearance that is decreased by the external fitting step and the swaging step based on an amount of expansion of the inner ring that is a difference between the outer-diameter dimension of the inner ring after formation of the swaged portion and the outer-diameter dimension of the inner ring before being externally fitted with the tubular fitting portion; and controlling the preload based on the amount of decrease in the axial clearance.

Note that the arranging step and the external fitting step can be performed simultaneously.

In the method for manufacturing the hub unit bearing according to an aspect of the present invention, an axial clearance of the hub unit bearing in a state after formation of the swaged portion is calculated by subtracting the amount of decrease in the axial clearance from an initial axial clearance, which is an axial clearance of the hub unit bearing in a state before formation of the swaged portion, and the preload is found in a completed state of the hub unit bearing based on that axial clearance.

The preload can be set within a specified range by using the preload in the completed state of the hub unit bearing found based on the axial clearance as feedback.

In the hub unit bearing according to an aspect of the present invention, the preload is controlled based on an amount of decrease in the axial clearance found from an amount of expansion of the inner ring, which is the difference between the outer-diameter dimension of the inner ring after formation of the swaged portion and the outer-diameter dimension of the inner ring before being externally fitted with the tubular fitting portion.

Advantageous Effects of Invention

With an aspect of the present invention, it is possible to more accurately control a preload applied to rolling bodies.

DESCRIPTION OF THE EMBODIMENTS

Figure 1:
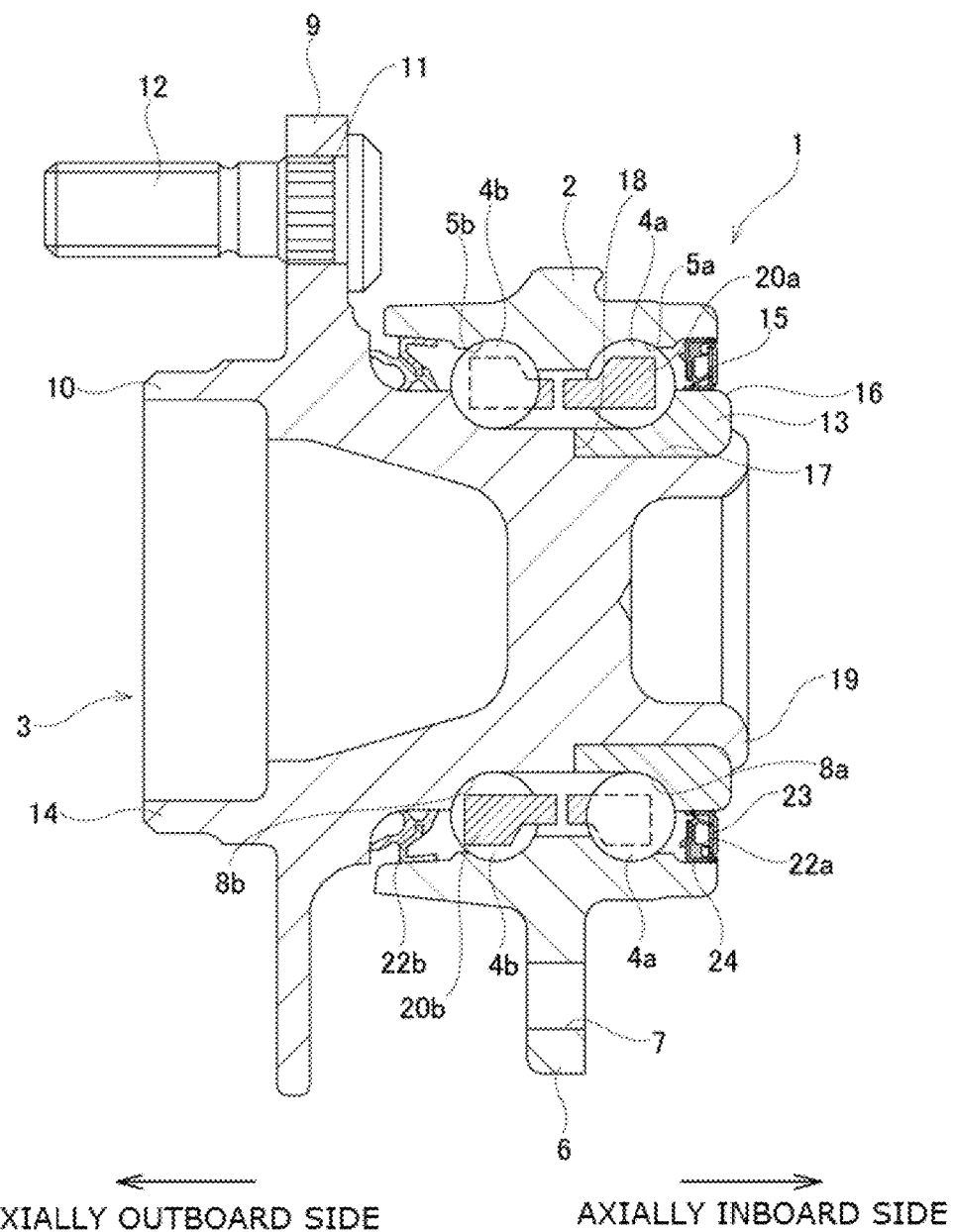
FIG. 1 is a cross-sectional view illustrating an example of a hub unit bearing that is an object of the present invention.
Figure 2:
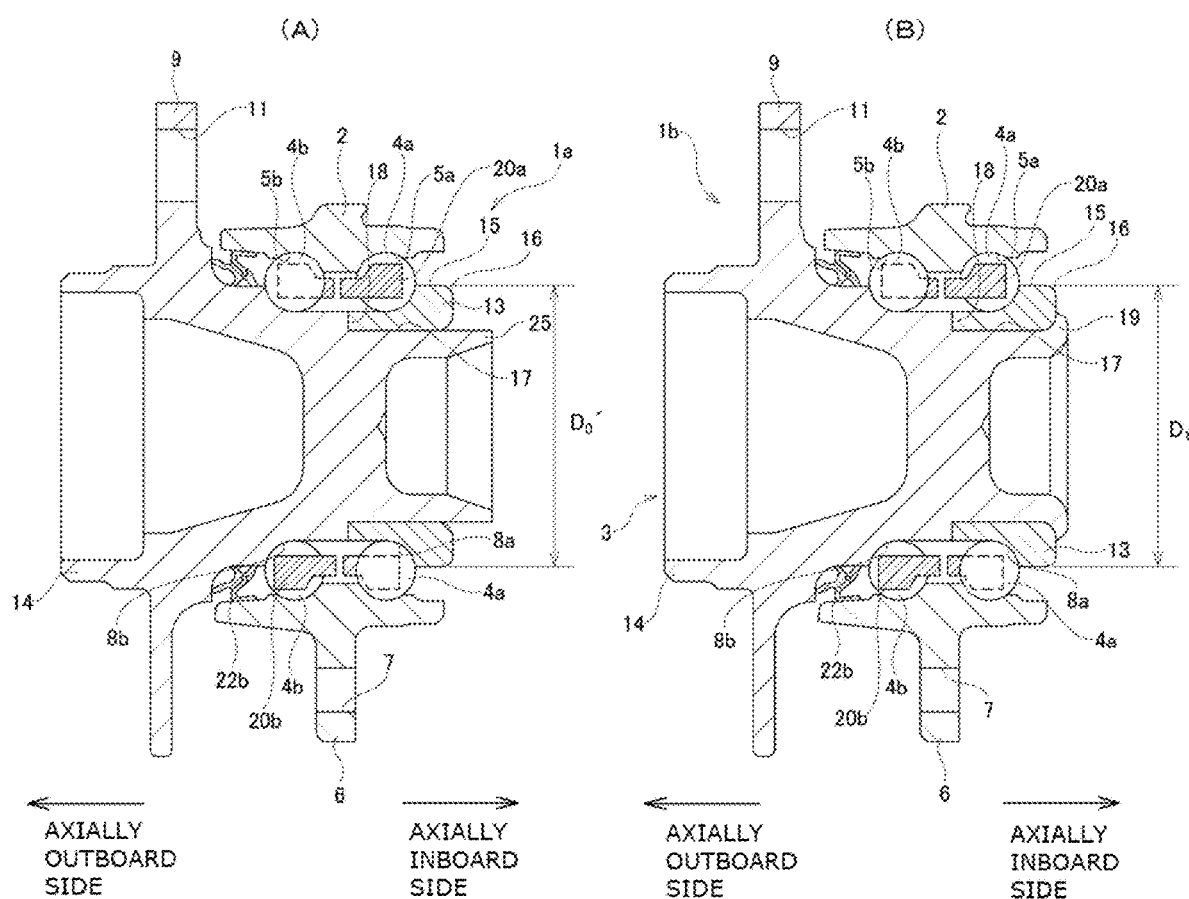
FIG. 2A is a cross-sectional view of the example of the hub unit bearing before formation of a swaged portion.
FIG. 2B is a cross-sectional view of an example of the hub unit bearing after formation of a swaged portion.

An example of an embodiment of the present invention will be described referring FIG. 1 to FIG. 7.

<Structure of Hub Unit Bearing>

A hub unit bearing 1 that is the object of this embodiment includes an outer ring 2, a hub 3, and rolling bodies 4a, 4b.

The outer ring 2 is made of a hard metal such as medium carbon steel or the like. The outer ring 2 has double-row outer-raceways 5a, 5b around the inner-circumferential surface, and has a stationary flange 6 at an axially intermediate section that protrudes toward the radially outer side. The stationary flange 6 has support holes 7 that penetrate in the axial direction at a plurality of locations in the circumferential direction of a radially intermediate section. The outer ring 2 is supported by and fastened to a suspension device by support bolts that are inserted through the support holes 7 of the stationary flange 6, and does not rotate even when a wheel rotates.

The hub 3 has double-row inner-raceways 8a, 8b around the outer-circumferential surface, and is coaxially arranged with the outer ring 2 on the radially inner side of the outer ring 2. The hub 3 has a rotating flange 9 located at a portion further on the axially outboard side than an end section on the axially outboard side of the outer ring 2 and protrudes toward the radially outer side, and has a cylindrical pilot section 10 at an end section on the other side in the axial direction. The rotating flange 9 has installation holes 11 that penetrate in the axial direction at a plurality of locations in the circumferential direction of a radially intermediate section. A stud 12 is press fitted (serration fit) in each of the installation holes 11. In other words, in this example, each installation hole 11 is composed of a press fitting hole.

Note that the "axially outboard side" is the outer side of the vehicle in a state in which the hub unit bearing 1 is assembled in the automobile, and is the left side in FIG. 1 to FIG. 4, FIG. 6 and FIG. 7. Conversely, the right side in FIG. 1 to FIG. 4, FIG. 6 and FIG. 7, which is the central side of the vehicle in a state in which the hub unit bearing 1 is assembled in the automobile, is referred to as the "axially inboard side".

A brake rotating body such as a disc, drum or the like, and wheel are fixed to the rotating flange 9 by inserting the pilot section 10 through a center hole that penetrates in the axial direction of a center section thereof, and inserting the studs 12 through through holes that axially penetrate at a plurality of locations in the circumferential direction of the radially intermediate section and screwing hub nuts on the tip-end sections of the studs 12.

Note that the installation holes of the rotating flange may be composed of female screw holes. In this case, the brake rotating body and wheel are joined and fastened to the rotating flange by screwing hub bolts that are inserted through through holes provided in the brake rotating body and through through holes provided in the wheel into the installation holes.

The hub 3 of this embodiment includes an inner ring 13 and a hub spindle 14.

The inner ring 13 is made of a hard metal such as bearing steel or the like. The inner ring 13 has an inner-raceway 8*a* on the axially inboard side of the double-row inner-raceways 8*a*, 8*b* at an axially intermediate section of the outer-circumferential surface. Furthermore, the inner ring 13 has an inner-ring shoulder section 15 at a portion of the outer-circumferential surface adjacent to the axially inboard side of the inner-raceway 8*a* on the axially inboard side, and has a chamfered section 16 having an arc-shaped cross section at a connecting section of the end surface on the axially inboard side and the inner-ring shoulder section 15. The inner-ring shoulder section 15 is composed of a cylindrical surface of which the outer-diameter dimension does not change along the axial direction.

The hub spindle 14 is made of a hard metal such as medium carbon steel or the like. The hub spindle 14 has an inner-raceway 8*b* on the axially outboard side of the double-row inner-raceways 8*a*, 8*b* at an axially intermediate section of the outer-circumferential surface. The hub spindle 14 has the rotating flange 9 that is located at a portion further on the axially outboard side than the inner-raceway 8*b* on the axially outboard side and that protrudes toward the radially outer side, and has the cylindrical shaped pilot section 10 at an end section on the axially outboard side.

The hub spindle 14 has a tubular fitting portion 17 that is located at a portion further on the axially inboard side than the inner-raceway 8*b* on the axially outboard side, the outer diameter of the tubular fitting portion 17 is smaller than that of a portion adjacent to the axially outboard side, and the inner ring 13 externally fits with the tubular fitting portion 17. Furthermore, the hub spindle 14 has a stepped surface 18 that faces toward the axially inboard side and to which the end surface on the axially outboard side of the inner ring 13 comes in contact, and has a swaged portion 19 that is bent toward the radially outer side of the end section on the axially inboard side of the tubular fitting portion 17 and that pushes the end surface on the axially inboard side of the inner ring 13. That is, the hub 3 of this embodiment is such that the inner ring 13 externally fits with the tubular fitting portion 17 of the hub spindle 14 with a press fit, and the swaged portion 19 pushes the end surface on the axially inboard side of the inner ring 13. In other words, the inner ring 13 is held on both sides in the axial direction between the stepped surface 18 and the swaged portion 19. As a result, the hub 3 is configured by joining and fastening the inner ring 13 and the hub spindle 14.

Each of the rolling bodies 4*a*, 4*b* is made of a hard metal such as bearing steel or the like, or is made of ceramic. The rolling bodies 4*a*, 4*b* are respectively arranged between the double-row outer-raceways 5*a*, 5*b* and the double-row inner-raceways 8*a*, 8*b*, and are respectively held by retainers 20*a*, 20*b* so as to be able to roll freely. As a result, the hub 3 is rotatably supported on the radially inner side of the outer ring 2. Moreover, a preload is applied to the rolling bodies 4*a*, 4*b* due to a force (axial force) that is applied toward the axially outboard side from the inner ring 13.

In this embodiment, balls are used as the rolling bodies 4*a*, 4*b*; however, it is also possible to use tapered rollers instead of balls. Furthermore, in this embodiment, the diameter of the pitch circle of the rolling bodies 4*a*, 4*b* in the row on the axially inboard side and the diameter of the pitch circle of the rolling bodies 4*a*, 4*b* in the row on the axially outboard side are the same as each other; however, the present invention can also be applied to an asymmetric type hub unit bearing in which the diameter of the pitch circle of the rolling bodies in the row on the axially inboard side and the diameter of the pitch circle of the rolling bodies in the row on the axially outboard side differ from each other.

The hub unit bearing 1 further includes seal devices 22*a*, 22*b* that are located between the inner-circumferential surface of the outer ring 2 and the outer-circumferential surface of the hub 3, and that cover opening sections on both sides in the axial direction of a cylindrical rolling body installation space 21 where the rolling bodies 4*a*, 4*b* are arranged.

Of the seal devices 22*a*, 22*b*, the seal device 22*a* on the axially inboard side includes a slinger 23 that is externally fastened to the inner-ring shoulder section 15 of the inner ring 13, and a seal ring 24 having seal lips that come in sliding contact with the surface of the slinger 23 around the entire circumference. In other words, in this embodiment, the seal device 22*a* on the axially inboard side is composed of a combination seal ring.

Note that a seal device on the axially inboard side for covering the opening section on the axially inboard side of the rolling body installation space could also be configured by a bottomed cylindrical shaped cover that is internally fixed to the outer ring. In this case, it is possible to externally fix an encoder for detecting the number of rotations (rotational speed) of the wheel to the inner-ring shoulder section of the inner ring as necessary.

Of the seal devices 22*a*, 22*b*, the seal device 22*b* on the axially outboard side has seal lips that come in sliding contact with the outer-circumferential surface of the hub 3 or the surface on the axially inboard side of the rotating flange 9 around the entire circumference. In other words, in this embodiment, the seal device 22*b* on the axially outboard side is composed of a seal ring.

<Method for Manufacturing Hub Unit Bearing>

When manufacturing the hub unit bearing 1, as illustrated in FIG. 2A, the outer ring 2 and the rolling bodies 4*a*, 4*b* are arranged around the hub spindle 14, and the inner ring 13 is externally fitted with the tubular fitting portion 17 to assemble the hub unit bearing 1*a* to a state before forming the swaged portion 19. More specifically, the rolling bodies 4*a*, 4*b*, in a state of being held in the retainers 20*a*, 20*b*, for example, are arranged on the radially inner side of the double-row outer-raceways 5*a*, 5*b* of the outer ring 2, and the seal device 22b on the axially outboard side is internally fitted with the end section on the axially outboard side of the outer ring 2 to obtain an outer ring assembly. Next, the hub spindle 14 is inserted into the outer ring assembly from the axially outboard side. Finally, the inner ring 13 is externally fitted with the tubular fitting portion 17 of the hub spindle 14 with a press fit. However, the procedure for assembling the hub unit bearing 1a is not particularly limited, and as long as no contradictions occur, the order of steps may be changed or may be performed at the same time.

Next, as illustrated going from FIG. 2A to FIG. 2B, the swaged portion 19 is formed by plastically deforming a tubular portion 25 of the hub spindle 14 that protrudes further toward the axially inboard side than the end surface on the axially inboard side of the inner ring 13 toward the radially outer side. As a result, the inner ring 13 and the hub spindle 14 are joined and fixed together to form the hub 3, and a proper preload is applied to the rolling bodies 4a, 4b. Then, by installing the seal device 22a on the axially inboard side in between the end section on the axially inboard side of the outer ring 2 and the end section on the axially inboard side of the hub 3, the hub unit bearing 1 is completed.

The method for forming the swaged portion 19 is not particularly limited. The swaged portion 19 could also be formed for example by pushing a die that is supported so as to be able to rotate around a rotation axis that is inclined with respect to the center axis of the hub spindle 14 against the end section on the axially inboard side of the tubular portion 25 while at the same time oscillating the die around the center axis of the hub spindle 14. Alternatively, the swaged portion 19 could be formed by stamping (deburring press) in which a die pushes the end section of the axially inboard side of the tubular portion 25 in the axial direction.

In the manufacturing method of this embodiment, in order to control the preload that is applied to the rolling bodies 4a, 4b in the completed state of the hub unit bearing 1, the outer-diameter dimension $D_0$ of the inner ring 13 as a single body before being externally fitted with the tubular fitting portion 17 of the hub spindle 14 is measured. More specifically, the outer-diameter dimension $D_0$ of the inner-ring shoulder section 15 of the inner ring 13 is measured. The inner-ring shoulder section 15 is composed of a cylindrical surface having good shape accuracy to which the slinger 23 of the seal device 22a, which is a combination seal ring, or an encoder is externally fitted. The position in the axial direction of the portion of the inner-ring shoulder section 15 where the outer-diameter dimension $D_0$ is measured is not particularly limited. However, from the aspect of maintaining a large difference between the outer-diameter dimension $D_0$ of the inner ring 13 before being externally fitted with the hub spindle 14, and the outer-diameter dimension $D_1$ of the inner ring 13 after formation of the swaged portion 19, preferably the outer-diameter dimension $D_0$ of the inner-ring shoulder section 15 is measured within a range located further on the axially outboard side than the chamfered section 16 and located as much as possible on the axially inboard side.

In the manufacturing method of this embodiment, the outer-diameter dimension $D_1$ of the inner ring 13 is measured after the swaged portion 19 is formed and before the seal device 22a on the axially inboard side is installed. The position in the axial direction of the portion where the outer-diameter dimension $D_1$ of the inner ring 13 is measured is the same as the position in the axial direction of the portion where the outer-diameter dimension $D_0$ of the inner ring 13 before being externally fitted with the tubular fitting portion 17 of the hub spindle 14 is measured.

An amount of decrease $\Delta C$ in the axial space is found based on the amount of expansion $\Delta D$ of the inner ring 13, which is the difference $(D_1-D_0)$ between the outer-diameter dimension $D_1$ of the inner ring 13 after the swaged portion 19 is formed (swaged state) and the outer-diameter dimension $D_0$ of the inner ring 13 before being externally fitted with the tubular fitting portion 17 of the hub spindle 14. The amount of decrease $\Delta C$ in the axial clearance represents the amount of decrease in the axial clearance of the hub unit bearing 1 that occurs when the swaged portion 19 is formed. The relation between the amount of expansion $\Delta D$ of the inner ring 13 and the amount of decrease $\Delta C$ in the axial clearance is found beforehand through experimentation and simulation, and is stored as a map or formula in memory of a computing device. In other words, the amount of expansion $\Delta D$ of the inner ring 13 is inputted to the computing device, and the amount of decrease $\Delta C$ in the axial clearance is found using the map or formula.

In this embodiment, the preload applied to the rolling bodies 4a, 4b is controlled based on the amount of decrease $\Delta C$ in the axial clearance that is found in this way. More specifically, determining whether or not the preload applied to the rolling bodies 4a, 4b is within a proper range, or setting the preload to be applied to the rolling bodies 4a, 4b to a proper range is performed based on the amount of decrease $\Delta C$ in the axial clearance.

As described above, in the method for manufacturing a hub unit bearing of this embodiment, the amount of decrease $\Delta C$ in the axial clearance of the hub unit bearing 1 is found based on the amount of expansion $\Delta D$, which is the difference between the outer-diameter dimension $D_1$ of the inner ring 13 in the swaged state and the outer-diameter dimension $D_0$ of the inner ring 13 as a single body before being externally fitted with the tubular fitting portion 17 of the hub spindle 14. In other words, in this embodiment, the effect that not only the amount of expansion of the inner ring 13 due to the formation of the swaged portion 19 (the amount of expansion of the inner ring 13 from the state illustrated in FIG. 2A to the state illustrated in FIG. 2B), but also the amount of expansion of the inner ring 13 after being press fitted with the tubular fitting portion 17 of the hub spindle 14 has on the amount of decrease in the axial clearance of the hub unit bearing 1 due to formation of the swaged portion 19 is taken into consideration. Therefore, with this embodiment, it is possible to more accurately control the preload applied to the rolling bodies 4a, 4b when compared with a case as in the method described in JP 2003-013979A in which only the amount of expansion of the inner ring due to the formation of the swaged portion is taken into consideration, and the amount of expansion of the inner ring due to being press fitted with the hub spindle is not considered.

Figure 4:
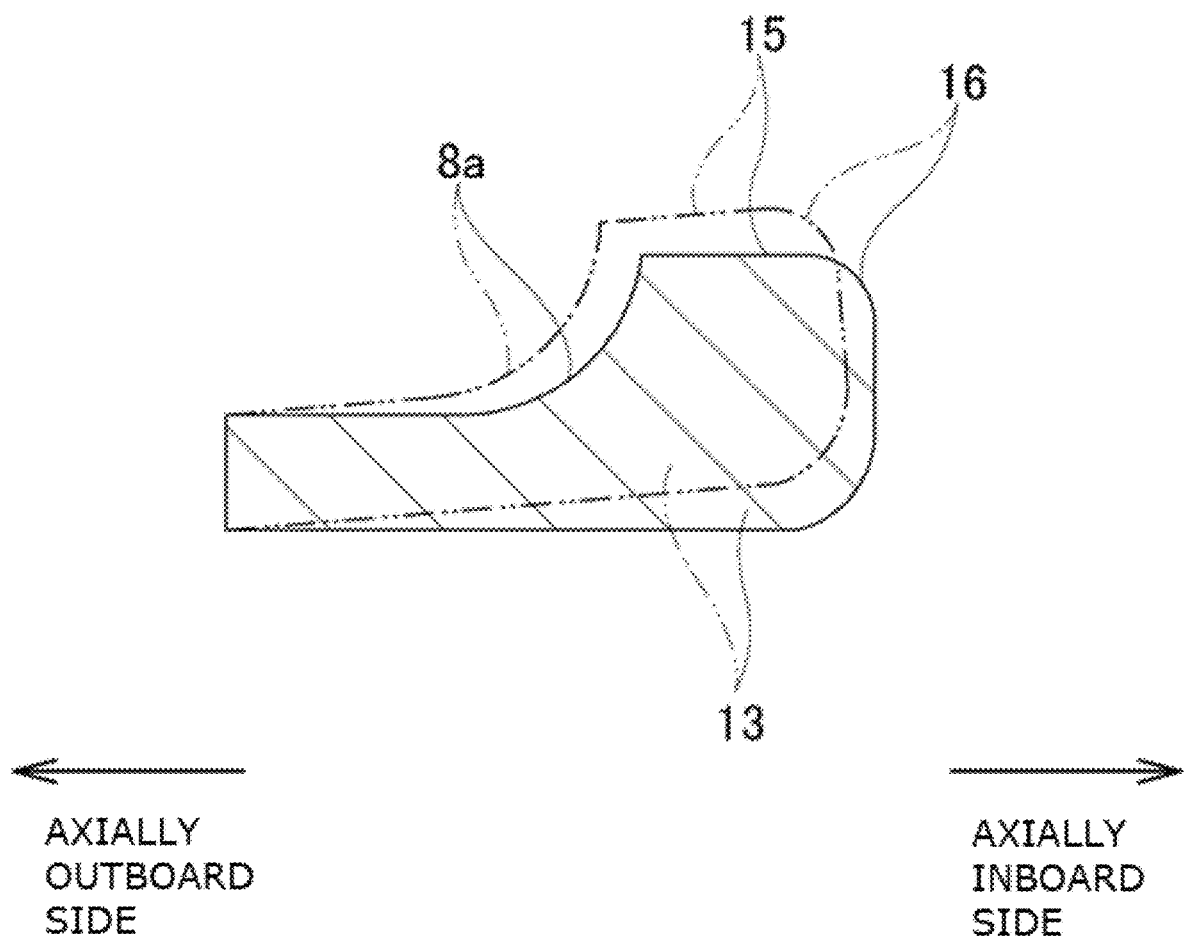
FIG. 4 is a cross-sectional view illustrating an exaggerated state of expansion of the inner ring that occurs during formation of the swaged portion.

The reason for this will be described using FIG. 4 and FIG. 5. The inner ring 13 that is externally fitted with the tubular fitting portion 17 of the hub spindle 14, as exaggeratedly illustrated by the chain line in FIG. 4, expands toward the radially outer side as the swaged portion 19 is formed, and as the dimension in the axial direction shrinks such that the end surface on the axially inboard side of the inner ring 13 moves toward the axially outboard side.

Here, in a case where the interference of the inner ring 13 with respect to the tubular fitting portion 17 is large, the friction force acting between the outer-circumferential surface of the tubular fitting portion 17 and the inner-circumferential surface of the inner ring 13 will become large. Therefore, when the interference of the inner ring 13 with respect to the tubular fitting portion 17 is large, the amount of movement of the end surface on the axially inboard side of the inner ring 13 toward the axially outboard side decreases, and the amount of expansion of the inner ring 13 also decreases as the swaged portion 19 is formed. In other words, when the interference of the inner ring 13 with respect to the tubular fitting portion 17 is large, the amount of decrease in the axial clearance due to formation of the swaged portion 19 decreases.

Conversely, in a case where the interference of the inner ring 13 with respect to the tubular fitting portion 17 is small, the friction force acting between the outer-circumferential surface of the tubular fitting portion 17 and the inner-circumferential surface of the inner ring 13 will become small. Therefore, when the interference of the inner ring 13 with respect to the tubular fitting portion 17 is small, the amount of movement of the end surface on the axially inboard side of the inner ring 13 toward the axially outboard side increases, and the amount of expansion of the inner ring 13 also increases as the swaged portion 19 is formed. In other words, when the interference of the inner ring 13 with respect to the tubular fitting portion 17 is small, the amount of decrease in the axial clearance due to formation of the swaged portion 19 increases.

Figure 5:
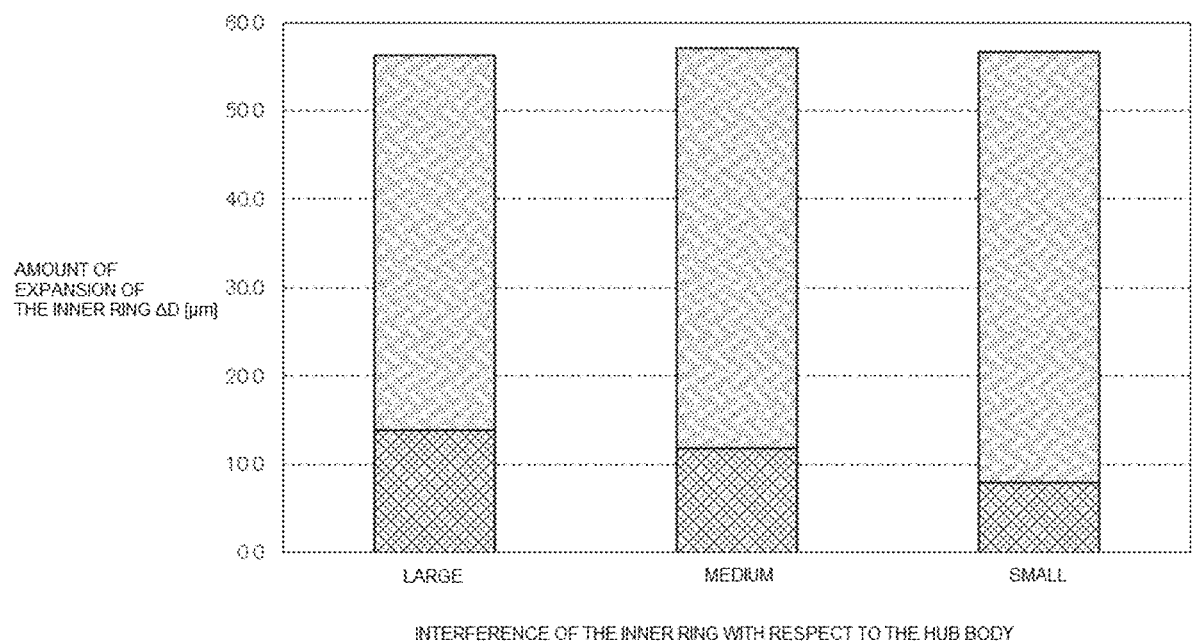
FIG. 5 is a graph illustrating the relation in the hub of the example of the hub unit bearing between the amount of expansion of the inner ring that occurs due to externally fitting the inner ring with the hub spindle of the hub by press fitting, and the amount of expansion of the inner ring that occurs due to formation of a swaged portion on the hub spindle.

Therefore, in a case where the processing load for forming the swaged portion 19 is the same for a specific size, as illustrated in FIG. 5, it is considered that regardless of the size of the interference of the inner ring 13 with respect to the tubular fitting portion 17, the amount of expansion of the inner ring 13 from a single body state before being externally fitted with the tubular fitting portion 17 becomes mostly a fixed amount, and the amount of decrease $\Delta C$ in the axial clearance also becomes mostly a fixed amount.

In the method described in JP 2003-013979A, only the amount of expansion of the inner ring before and after formation of the swaged portion (portion indicated by the mat pattern in FIG. 5) is measured, and the effect of the size of the interference of the inner ring with respect to the hub spindle (amount of expansion of the inner ring due to being press fitted with the hub spindle illustrated by the grid in FIG. 5) is not considered. On the other hand, with the preload estimation method for the hub unit bearing of this embodiment, the amount of expansion of the inner ring 13 from the single body state is measured, and also the effect of the size of the interference of the inner ring 13 with respect to the tubular fitting portion 17 is considered. Therefore, with the preload estimation method for the hub unit bearing of this embodiment, it is possible to more accurately control the amount of decrease $\Delta C$ in the axial clearance, and consequently, the preload applied to the rolling bodies 4a, 4b.

Note that in the manufacturing method of this embodiment, it is also possible to additionally find the initial axial clearance $C_0$, which is the axial clearance of the hub unit bearing 1a in the state before formation of the swaged portion 19 (state illustrated in FIG. 2A). Then, by reducing the amount of decrease $\Delta C$ in the axial clearance from the initial axial clearance $C_0$, it is possible to calculate the axial clearance $C_1$ of the hub unit bearing 1b in the state after formation of the swaged portion 19 (state illustrated in FIG. 2B) ($C_1 = C_0 - \Delta C$). Furthermore, it is possible to find the preload applied to the rolling bodies 4a, 4b in the completed state of the hub unit bearing 1 (state illustrated in FIG. 1) based on the axial clearance $C_1$.

Figure 3:
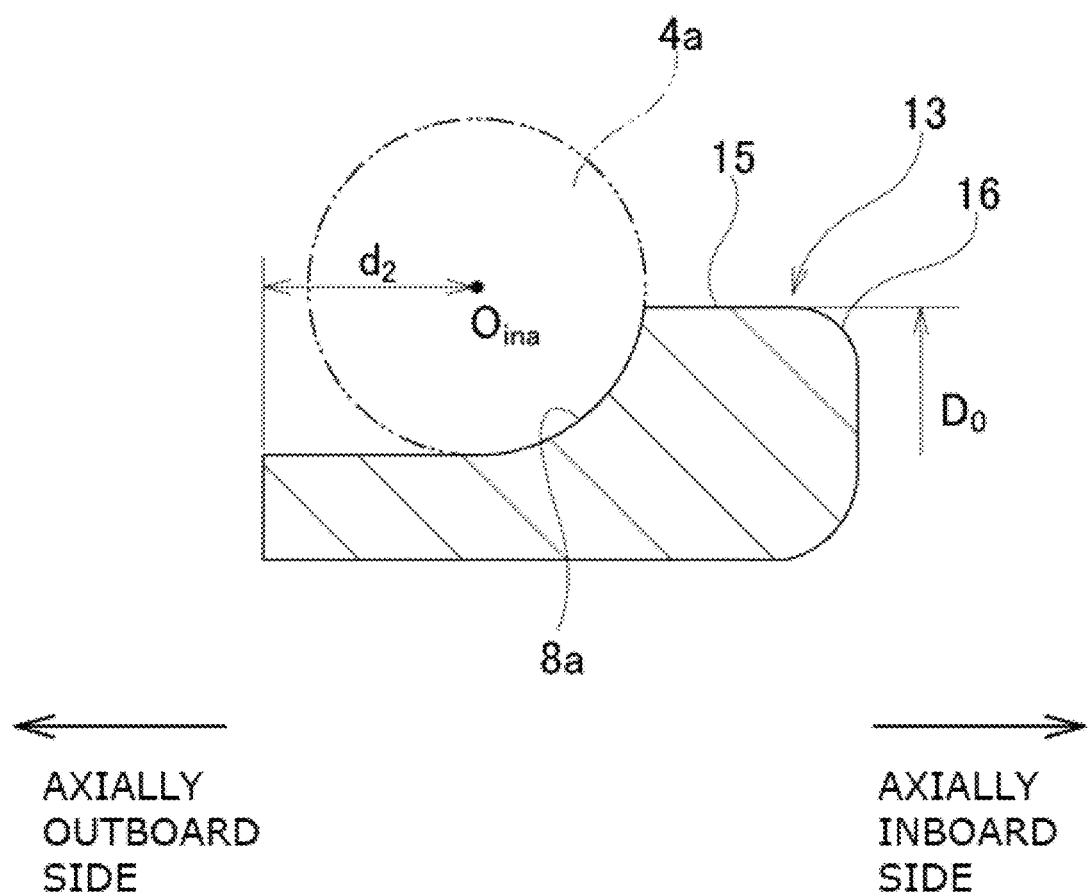
FIG. 3 is a cross-sectional view of an inner ring constituting a hub of the example of the hub unit bearing.
Figure 6:
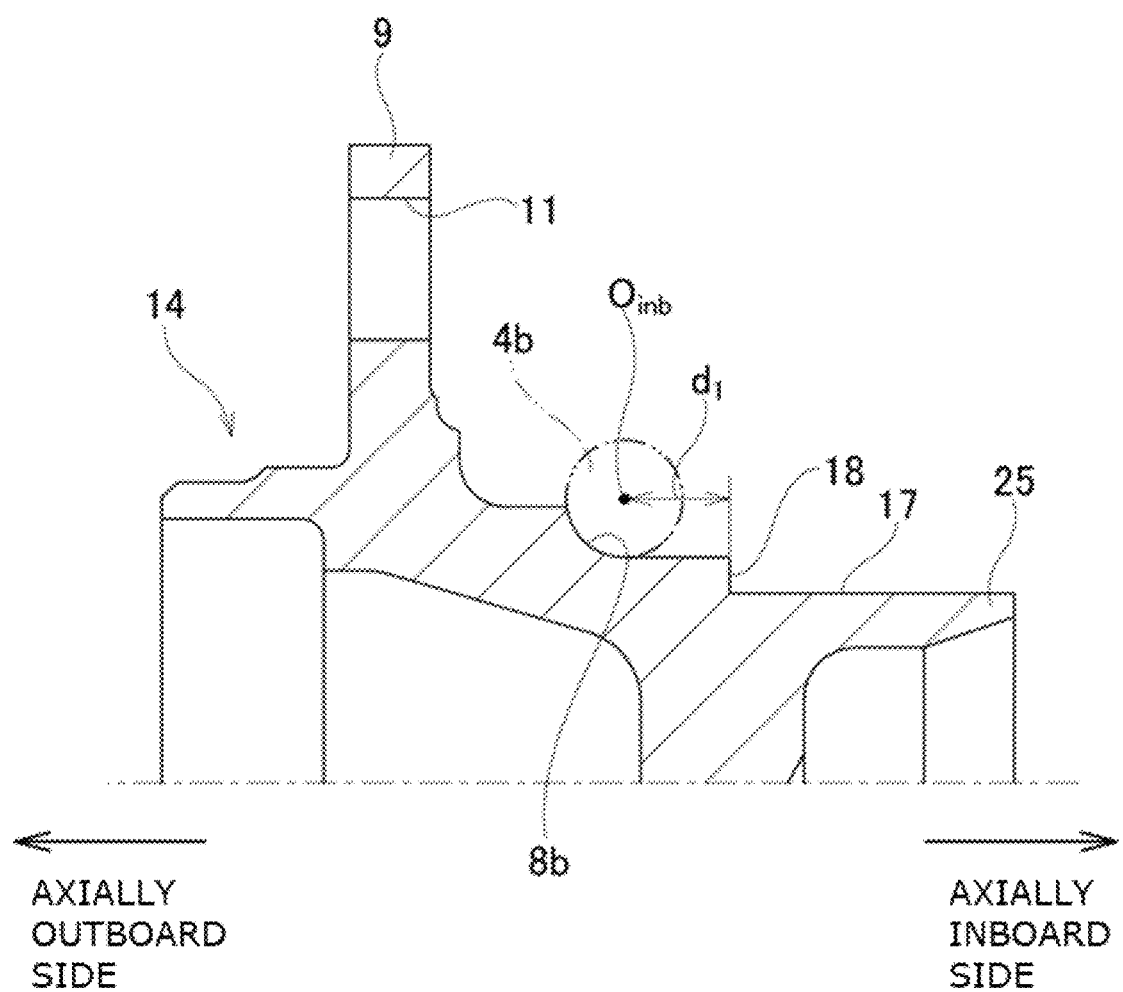
FIG. 6 is a cross-sectional view illustrating the removed hub spindle.
Figure 7:
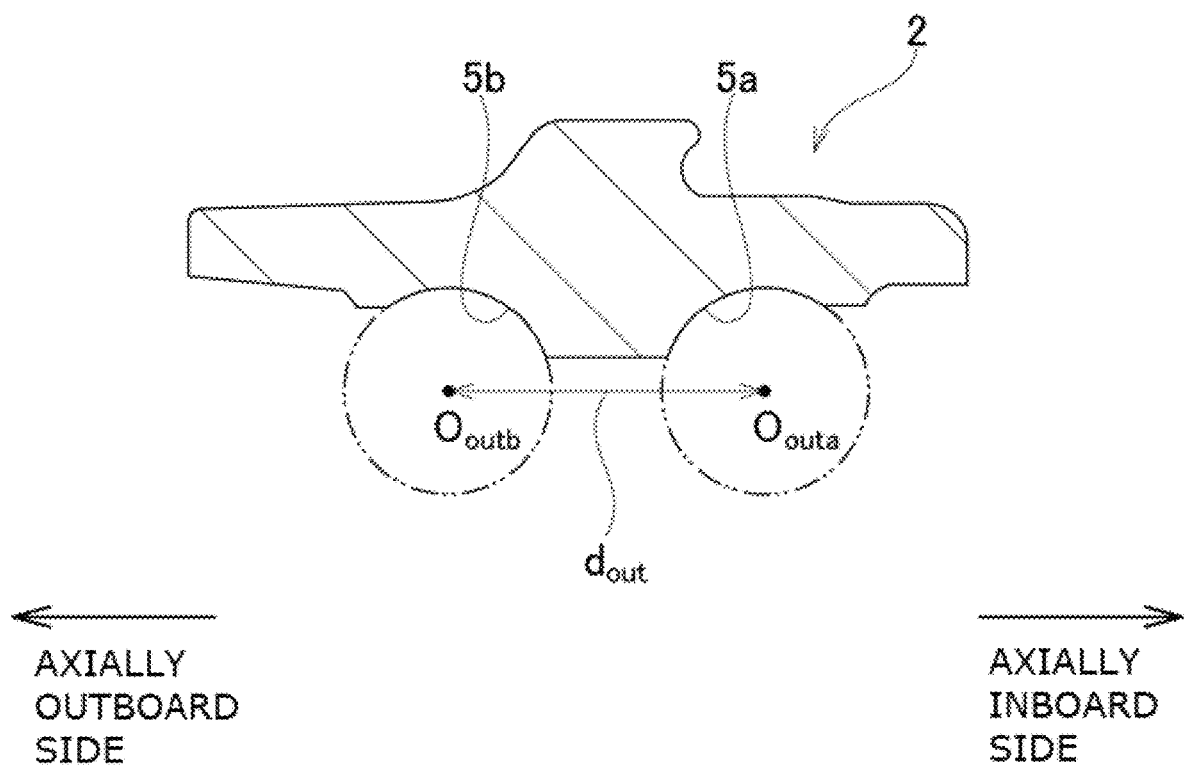
FIG. 7 is a cross-sectional view of an outer ring of the example of the hub unit bearing

In order to find the initial axial clearance $C_0$, as illustrated in FIG. 6, in the single body state of the hub spindle 14, a first dimension $d_1$, which is the interval in the axial direction between the center $O_{inb}$ of the rolling bodies 4b and the stepped surface 18, is measured for a case where it is presumed that the rolling bodies 4b in the row on the axially outboard side are in rolling contact with the inner-raceway 8b on the axially outboard side of the hub spindle 14. Moreover, as illustrated in FIG. 3, in the single body state of the inner ring 13, a second dimension $d_2$, which is the interval in the axial direction between the center $O_{ina}$ of the rolling bodies 4a and the end surface on the axially outboard side of the inner ring 13, is measured for a case where it is presumed that the rolling bodies 4a of the row on the axially inboard side are in rolling contact with the inner-raceway 8a on the axially inboard side of the inner ring 13.

The first dimension $d_1$ and the second dimension $d_2$ can be measured, for example, by using a dedicated measuring device that includes a curved surface section having a radius of curvature that is the same as ½ the diameter of the rolling bodies 4a, 4b (ball diameter), and a measuring element that is capable of moving toward or away from the curved surface section. In other words, in the single body state of the hub spindle 14, the first dimension $d_1$ is obtained by bringing the curved surface section in contact with the inner-raceway 8b on the axially outboard side, and bringing the measuring element in contact with the stepped surface 18, and then measuring the interval in the axial direction between the center of curvature of the curved surface section and the stepped surface 18. Moreover, in the single body state of the inner ring 13, the second dimension $d_2$ is obtained by bringing the curved surface section of the measuring device in contact with the inner-raceway 8a on the axially inboard side, and bringing the measuring element in contact with the end surface on the axially outboard side of the inner ring 13, and then measuring the interval in the axial direction between the center of curvature of the curved surface section and the end surface on the axially outboard side of the inner ring 13. Furthermore, a second dimension $d_2'$ is obtained by correcting the second dimension $d_2$ in consideration of the interference of the inner ring 13 with respect to the tubular fitting portion 17. In other words, the corrected second dimension $d_2'$ is obtained by reducing the second dimension $d_2$ by the amount that the center of the rolling bodies 4a of the row on the axially inboard side move toward the axially outboard side due to expansion of the inner-raceway 8a on the axially inboard side as the inner ring 13 is press fitted with the tubular fitting portion 17.

By finding the sum of the first dimension $d_1$ and the corrected second dimension $d_2'$ ($d_1 + d_2'$), an inner-raceway distance $d_{in}$, which is the distance between the double-row inner-raceways 8a, 8b in a state in which no axial force is applied by the swaged portion 19, is obtained.

Moreover, in the single body state of the outer ring 2, an outer-raceway distance $d_{out}$, which is the distance in the axial direction between the center $O_{outa}$ of the rolling bodies 4a of the row on the axially inboard side and the center $O_{outb}$ of the rolling bodies 4b of the row on the axially outboard side, is measured for a case in which it is presumed that the rolling bodies 4a, 4b are in rolling contact with the double-row outer-raceways 5a, 5b of the outer ring 2.

The outer-raceway distance $d_{out}$ can be measured, for example, using a dedicated measuring device that includes a pair of curved surface sections having a radius of curvature that is the same as ½ the diameter of the rolling bodies 4a, 4b (ball diameter), and that are capable of moving toward or away from each other. In other words, in the single body state of the outer ring 2, the outer-raceway distance $d_{out}$ is obtained by bringing the pair of curved surface sections in contact with the double-row outer-raceways 5a, 5b and measuring the distance in the axial direction between the centers of curvature of the pair of curved surface sections.

The initial axial clearance $C_0$ in the state before formation of the swaged portion 19 is obtained by finding the difference ($d_{out}-d_{in}$) between the outer-raceway distance $d_{out}$ and the inner-raceway distance $d_{in}$.

Note that in a case where tapered rollers are used as the rolling bodies, the center of the rolling bodies that is specified for measuring the first dimension, the second dimension, and the outer-raceway distance can be set at any arbitrary position on the center axis of the rolling bodies. More specifically, of the center axis of the rolling bodies, an axially central position of the rolling bodies can be set as the center of the rolling bodies.

The axial clearance $C_1$ of the hub unit bearing 1b in the swaged state is found by subtracting the amount of decrease $\Delta C$ in the axial clearance from the initial axial clearance $C_0$.

Then, based on the axial clearance $C_1$, it is possible to calculate the preload applied to the rolling bodies 4a, 4b in the completed state of the hub unit bearing 1, and to determine whether or not the calculated preload is within a proper range. Note that in this case, for the initial axial clearance $C_0$ for finding the axial clearance $C_1$ of the hub unit bearing 1b in the swaged state, it is possible to use a design value instead of finding the value through measurement.

Alternatively, it is possible to set the preload to be applied to the rolling bodies 4a, 4b to a proper specified range by calculating the preload applied to the rolling bodies 4a, 4b in the completed state of the hub unit bearing 1 based on the axial clearance $C_1$, and using the calculated preload as feedback. More specifically, it is possible to select from among a plurality of outer rings 2, inner rings 13, and hub spindle 14, a combination of an outer ring 2, an inner ring 13, and a hub spindle 14 for which the initial axial clearance $C_0$ will be proper, and it is possible to adjust the processing load when forming the swaged portion 19.

In any case, the relation between the axial clearance $C_1$ and the preload applied to the rolling bodies 4a, 4b in the completed state of the hub unit bearing 1 can be found beforehand by experimentation, simulation or the like.

In this embodiment, a case is described of using a so-called third-generation hub unit bearing 1 that includes a hub 3 formed by joining and fixing one inner ring 13 to the hub spindle 14 as the object; however, in the present invention, it is also possible to use a so-called 2.5-generation hub unit bearing that includes a hub formed by joining and fixing a pair of inner rings to a shaft member as the object. In the 2.5-generation hub unit bearing, a hub spindle is composed of a shaft member, and an inner ring on the axially outboard side of a pair of inner rings.

Moreover, in this embodiment, a case is described of a hub unit bearing 1 for a non-driven wheel in which the hub 3 (hub spindle 14) has a solid structure; however, in the present invention, it is also possible to use a hub unit bearing for a driven wheel in which the hub has an engagement hole in the center section for engaging with a drive shaft so as to be able to transmit torque.

EXAMPLES

Experimentation that was performed in order to confirm the effect of the present invention will be described. This experimentation was performed using a hub unit bearing 1 such as illustrated in FIG. 1 that uses balls as the rolling bodies 4a, 4b. In this experimentation, a case (Example) in which an amount of change in the outer-diameter dimension of the inner ring 13 from a single body state of the inner ring 13 before being externally fitted with the tubular fitting portion 17 of the hub spindle 14 is taken to be the amount of expansion $\Delta D$ of the inner ring 13, and a case (Comparative Example) in which an amount of change in the outer-diameter dimension of the inner ring 13 from a state of the inner ring 13 being externally fitted with the tubular fitting portion 17 before formation of the swaged portion 19 (state illustrated in FIG. 2A) is taken to be the amount of expansion $\Delta D'$ of the inner ring 13, and the correlations between the amounts of change $\Delta D$, $\Delta D'$ of the inner ring 13 and the amount of decrease $\Delta C$ in the axial clearance of the hub unit bearing 1 were found. The specifications of the hub unit bearing 1 were as described below.

<Specifications of the Hub Unit Bearing 1>

Diameter of the rolling bodies 4a, 4b (ball diameter): 11.906 [mm]

Pitch circle diameter of the rolling bodies 4a, 4b: 61 [mm]

Material of the rolling bodies 4a, 4b: SUJ2 (bearing steel)

Material of the inner ring 13: SUJ2 (bearing steel)

Material of the hub spindle 14: S53C (medium carbon steel)

Outer diameter of the inner-ring shoulder section 15 (in the single body state): 60 [mm]

Note that it is difficult to accurately measure the preload applied to the rolling bodies 4a, 4b, and thus in this experimentation, even after formation of the swaged portion 19, the initial axial clearance $C_0$ was set to be larger than that of an actual product so that the axial clearance of the hub unit bearing 1 would be positive.

The swaged portion 19 was formed by using a die that is supported so as to be able to rotate about a rotation axis that is inclined with respect to the center axis of the hub spindle 14 to push and swage the end section on the axially inboard side of the tubular portion 25 with a load of 10.8 [kN] while oscillating the die about the center axis of the hub spindle 14 with a rotating motion (revolving motion) at rotating speed of 5 [$s^{-1}$].

The initial axial clearance $C_0$ of the hub unit bearing 1 used in this experimentation was found by measuring the amount of displacement in the axial direction of the hub 3 while restricting the axial displacement of the outer ring 2 in the state illustrated in FIG. 2A.

The axial clearance $C_1$ of the hub unit bearing 1 in the completed state was found by measuring the amount of axial displacement of the hub 3 while restricting the axial displacement of the outer ring 2 in the state illustrated in FIG. 2B.

The amount of decrease $\Delta C$ in the axial clearance was calculated by finding the difference ($C_0-C_1$) between the initial axial clearance $C_0$ and axial clearance $C_1$ in the complete state.

Figure 8:
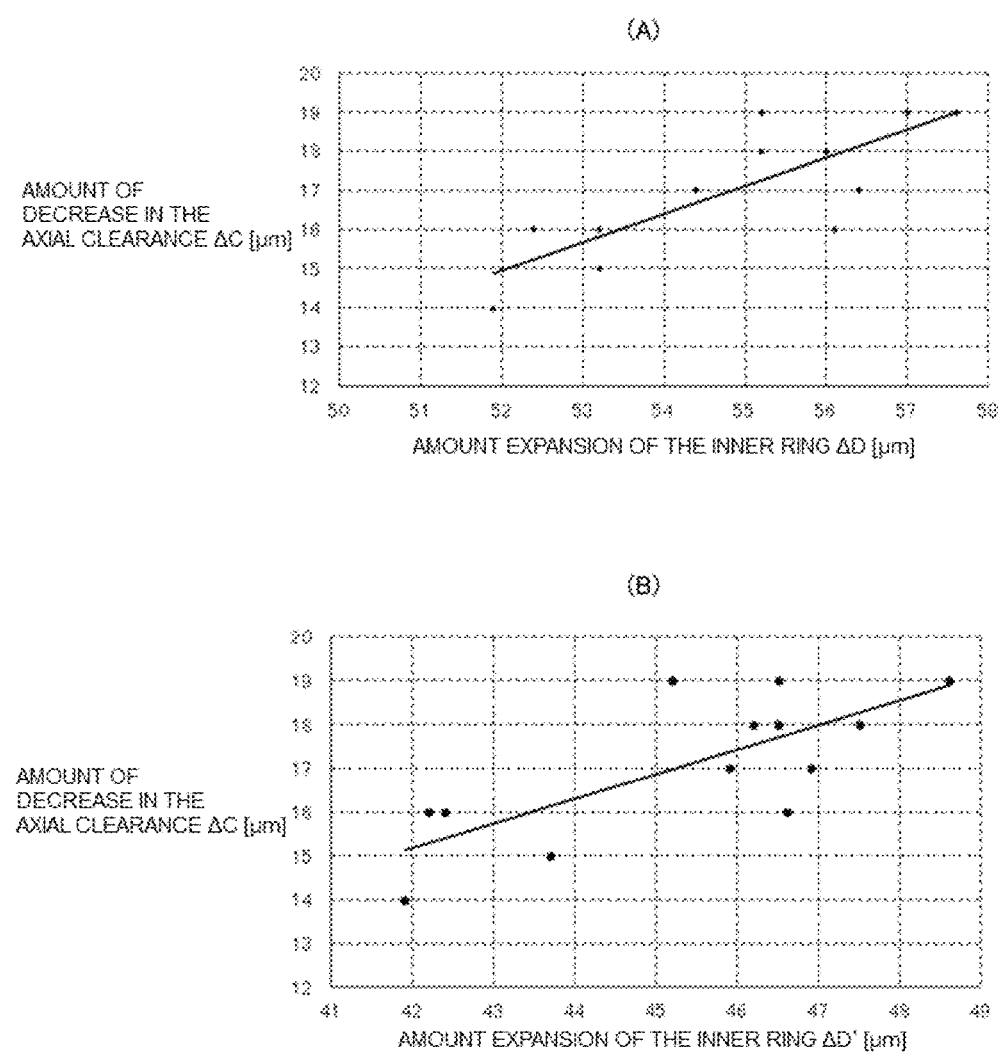
FIG. 8A is a graph illustrating a relation in the hub of the example of the hub unit bearing between an amount of expansion $\Delta D$ of the inner ring from a single body state before externally fitting the inner ring with the tubular fitting portion of the hub spindle, and an amount of reduction $\Delta C$ of an axial clearance.
FIG. 8B is a graph illustrating a relation between an amount of expansion $\Delta D'$ of the inner ring from a state in which the inner ring is externally fitted with the tubular fitting portion before formation of the swaged portion, and an amount of reduction $\Delta C$ of an axial clearance.

In the Example, the amount of expansion $\Delta D$ of the inner ring 13 was found by measuring the outer-diameter dimension $D_0$ of the inner ring 13 (inner-ring shoulder section 15) before being externally fitted with the tubular fitting portion 17, and the outer-diameter dimension $D_1$ of the inner ring 13 after formation of the swaged portion 19, and calculating the difference ($D_1-D_0$) of these for fourteen hub unit bearings 1. The amount of expansion $\Delta D$ of the inner ring 13 found in this way, and the amount of decrease $\Delta C$ in the axial clearance are plotted in FIG. 8A. Note that some of the calculated values of the amount of expansion $\Delta D$ of the inner ring 13 and the amount of decrease $\Delta C$ in the axial clearance were the same, and thus the number of plots in FIG. 8A (result of overlapping of some plot points) is twelve.

In the Comparative Example, the outer-diameter dimension $D_0'$ of the inner ring 13 after being fitted with the tubular fitting portion 17 and before formation of the swaged portion 19 was measured for fourteen hub unit bearings 1 in the same way as in the Example. Then, the amount of expansion ΔD' of the inner ring was found by calculating the difference ($D_1-D_0'$) with the outer-diameter dimension $D_1$ of the inner ring 13 after formation of the swaged portion 19. The amount of expansion ΔD' of the inner ring 13 found in this way, and the amount of decrease ΔC in the axial clearance are plotted in FIG. 8A. Note that some of the calculated values of the amount of expansion ΔD' of the inner ring 13 and the amount of decrease ΔC in the axial clearance were the same, and thus the number of plots in FIG. 8B (result of overlapping of some plot points) is thirteen.

In the Comparative Example, a correlation coefficient between the amount of expansion ΔD' of the inner ring 13 and the amount of decrease ΔC in the axial clearance was found to be 0.75; however, in the Example, a correlation coefficient between the amount of expansion ΔD of the inner ring 13 and the amount of decrease ΔC in the axial clearance was found to be 0.81. In other words, it was learned that the amount of expansion ΔD of the inner ring 13 from the single body state before being externally fitted with the tubular fitting portion 17 of the hub spindle 14 has a stronger correlation with the amount of decrease ΔC in the axial clearance than the amount of expansion ΔD' of the inner ring 13 from the state of being externally fitted with the tubular fitting portion 17 and before formation of the swaged portion 19, and thus consequently, has a stronger correlation with the preload applied to the rolling bodies 4a, 4b.

REFERENCE SIGNS LIST 1, 1a, 1b Hub unit bearing
2 Outer ring
3 Hub
4 Rolling body
5a, 5b Outer-raceway
6 Stationary flange
7 Support hole
8a, 8b Inner-raceway
9 Rotating flange
10 Pilot section
11 Installation hole
12 Stud
13 Inner ring
14 Hub spindle
15 Inner-ring shoulder section
16 Chamfered section
17 Tubular fitting portion
18 Stepped surface
19 Swaged portion
20a, 20b Retainer
21 Rolling body installation space
22a, 22b Seal device
23 Slinger
24 Seal ring
25 Tubular portion

The invention claimed is:

1. A method for manufacturing a hub bearing unit;
the hub bearing unit comprising:
an outer ring supported by and fastened to a suspension device so as not to rotate, and having double-row outer-raceways around an inner-circumferential surface thereof;
a hub to which a wheel is fastened and that rotates together with the wheel, and having double-row inner-raceways around an outer-circumferential surface thereof;
a plurality of rolling bodies arranged between the double-row outer-raceways and the double-row inner-raceways, and to which a preload is applied;
the hub comprising: an inner ring having an inner-raceway on an axially inner side of the double-row inner-raceways around an outer-circumferential surface thereof; and a hub spindle having an inner-raceway on an axially outboard side of the double-row inner-raceways around an outer-circumferential surface at an axially intermediate section thereof; and
the inner ring and the hub spindle, in a state in which the inner ring is externally fitted with a tubular fitting portion positioned further on the axially inboard side than the inner-raceway of the hub spindle that is on the axially outboard side, being joined and fastened together by pushing an end surface on the axially inboard side of the inner ring by a swaged portion formed by plastically deforming a tubular portion of the hub spindle that protrudes further toward the axially inboard side than an end surface on the axially inboard side of the inner ring outward in a radial direction;
the method for manufacturing the hub unit bearing comprising:
a pre-fitting step of measuring an outer-diameter dimension of the inner ring before externally fitting the inner ring with the tubular fitting portion;
an arranging step of arranging the outer ring and the rolling bodies around the hub spindle;
an external fitting step of externally fitting the inner ring with the tubular fitting portion;
a swaging step of forming the swaged portion by plastically deforming the tubular portion outward in the radial direction; and
a post-swaging step of measuring an outer-diameter dimension of the inner ring after formation of the swaged portion;
then, finding an amount of decrease in an axial clearance that is decreased by the external fitting step and the swaging step based on an amount of expansion of the inner ring that is a difference between the outer-diameter dimension of the inner ring after formation of the swaged portion and the outer-diameter dimension of the inner ring before being externally fitted with the tubular fitting portion; and
controlling the preload based on the amount of decrease in the axial clearance.

2. The method for manufacturing the hub unit bearing according to claim 1, wherein
an axial clearance of the hub unit bearing in a state after formation of the swaged portion is calculated by subtracting the amount of decrease in the axial clearance from an initial axial clearance, which is an axial clearance of the hub unit bearing in a state before formation of the swaged portion, and the preload is found in a completed state of the hub unit bearing based on the axial clearance.

3. The method for manufacturing the hub bearing unit according to claim 2, wherein
the preload is set within a specified range by using the preload in the completed state of the hub unit bearing that is found based on the axial clearance.

4. A hub unit bearing, comprising:

an outer ring supported by and fastened to a suspension device so as not to rotate, and having double-row outer-raceways around an inner-circumferential surface thereof;

a hub to which a wheel is fastened and that rotates together with the wheel, and having double-row inner-raceways around an outer-circumferential surface thereof;

a plurality of rolling bodies arranged between the double-row outer-raceways and the double-row inner-raceways, and to which a preload is applied;

the hub comprising: an inner ring having an inner-raceway on an axially inner side of the double-row inner-raceways around an outer-circumferential surface thereof; and a hub spindle having an inner-raceway on an axially outboard side of the double-row inner-raceways around an outer-circumferential surface at an axially intermediate section thereof; and the inner ring and the hub spindle, in a state in which the inner ring is externally fitted with a tubular fitting portion positioned further on the axially inboard side than the inner-raceway of the hub spindle that is on the axially outboard side, being joined and fastened together by pushing an end surface on the axially inboard side of the inner ring by a swaged portion formed by plastically deforming a tubular portion of the hub spindle that protrudes further toward the axially inboard side than an end surface on the axially inboard side of the inner ring outward in a radial direction;

wherein the preload is controlled based on an amount of decrease in an axial clearance found from an amount of expansion of the inner ring, which is the difference between an outer-diameter dimension of the inner ring after formation of the swaged portion and an outer-diameter dimension of the inner ring before being externally fitted with the tubular fitting portion.

* * * * *